Figure 1:
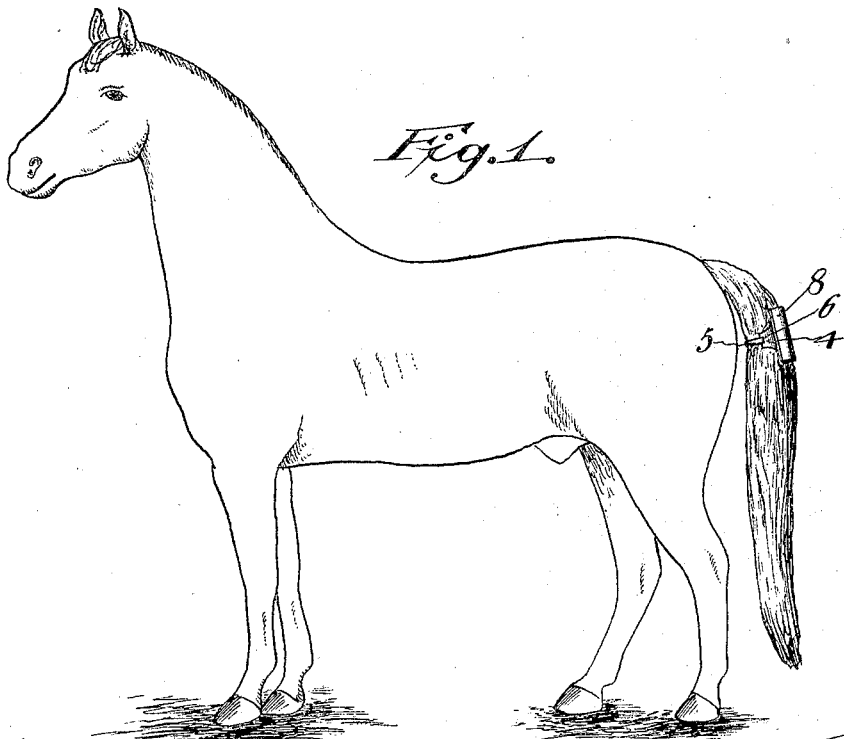

No. 640,917. Patented Jan. 9, 1900.
H. H. JONES.
HORSE TAIL PROTECTOR.
(Application filed Sept. 15, 1899.)

(No Model.)

Witnesses

Harvey H. Jones, Inventor.
By his Attorneys,

UNITED STATES PATENT OFFICE.

HARVEY H. JONES, OF HOLLANSBURG, OHIO.

HORSE-TAIL PROTECTOR.

SPECIFICATION forming part of Letters Patent No. 640,917, dated January 9, 1900.

Application filed September 15, 1899. Serial No. 730,611. (No model.)

*To all whom it may concern:*

Be it known that I, HARVEY H. JONES, a citizen of the United States, residing at Hollansburg, in the county of Darke and State of Ohio, have invented a new and useful Horse-Tail Protector, of which the following is a specification.

This invention relates to guards or protectors for horses' tails to prevent wearing and injuring the tail by rubbing against the stall or other object.

The object of the invention is to provide a new means for attaching the guard and, further, to provide the device with spurs or sharp points for sticking or prodding the animal when he starts to rub.

Other objects and advantages of a device constructed in accordance with my invention will be hereinafter more fully described, shown in the drawings, and particularly pointed out in the claims.

Figure 2:
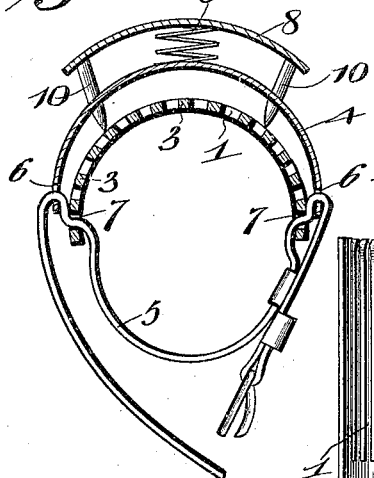
Figure 3:
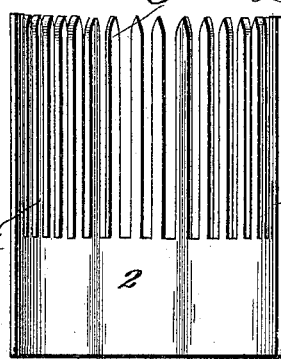
Figure 4:
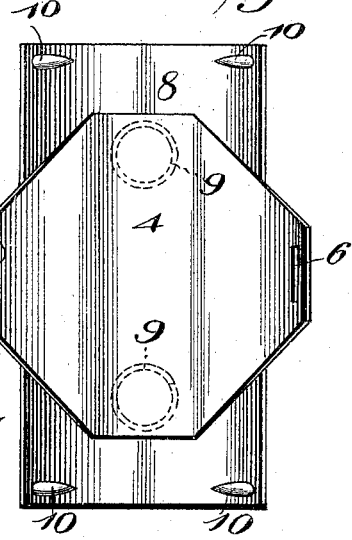

In the drawings, Figure 1 is a perspective view showing the device applied to a horse's tail. Fig. 2 is a transverse sectional view thereof. Fig. 3 is a detail view of the comb. Fig. 4 is a plan view with the comb removed.

Corresponding parts in the several figures are denoted by like characters of reference.

Referring to the drawings, 1 designates a comb, segmental in cross-section, as shown in Fig. 2, and comprising a body 2 and the fingers 3. Fitted about the convex face of the comb is a plate or cover 4 of similar segmental shape and spaced apart from the comb, as illustrated in Fig. 2. The comb and cover are connected together by a suitable strap 5. This strap is passed through eyes 6 in the cover 4 and eyes 7 in the comb, as shown in Fig. 2, whereby the comb and cover are connected together and the animal's tail is adapted to fit between the comb and the strap, as will be understood.

A plate 8, forming a back to the device, is connected to the cover 4 by means of suitable springs 9. This plate is segmental in cross-section to correspond with the comb and its cover, being somewhat longer, so as to project beyond the latter, and is provided at each of its four corners with sharp spurs 10, extending inward or upon the comb side of the back.

In applying the device the strap 5 is loosened and the comb forced beneath the hairs of the tail and against the tail-bone, the hair is placed between the comb and the cover 4, and the strap is then buckled tightly around the tail and next to the body of the animal, as shown in Fig. 1. In this position the device is firmly secured upon the tail, with the comb underneath the hair and engaged therewith and the cover tightly clamped around the hair. Thus the latter is confined between the comb and its cover. The back 8 is normally held away from contact with the animal by means of the coiled springs 9; but should the animal attempt to rub his tail against any object the back 8 will be forced toward the animal and the spurs 10 will prick him and cause him to stop rubbing, when the back will resume its normal position away from the animal, as will be understood.

The device is preferably applied near the root of the tail, as shown, and the hairs upon the outer side of the tail at this point are confined between the comb and its cover and are thereby prevented from rubbing against each other, while the back 8 receives all of the wear occasioned by contact with the stall and other horses or objects. The device is capable of use without the back carrying the spurs, as the cover would receive the wear occasioned by the rubbing, and the hair of the tail being bound tightly together will not be worn, as heretofore described.

My invention as herein described presents an exceedingly simple and useful guard, is held upon the tail so as to bind the hairs thereof together and prevent them being rubbed against each other, and also provides means for pricking or prodding the animal to cause him to stop rubbing.

Changes in the form, proportion, and minor details may be made without departing from the spirit and scope or sacrificing any of the advantages of my invention, and therefore I do not wish to be understood as limiting myself to the precise construction and arrangement as herein set forth.

Having thus described the invention, what I claim, and desire to secure by Letters Patent, is—

1. A tail-protector, comprising a comb, a cover, a back yieldingly mounted upon the cover and provided with spurs, and means for fastening the device upon the tail of an animal.

2. A tail-protector, comprising a comb, a cover, spaced apart from the comb, a back carried by the cover, springs interposed between the cover and the back and yieldingly mounting the latter, and a strap connecting the comb and cover, and also forming a fastening for applying the device to the tail of an animal.

3. A tail-protector, comprising a bowed comb, a similarly-bowed cover located upon the convex side of the comb and spaced therefrom, a bowed back yieldingly supported upon the outer side of the cover, and provided upon its concave side with spurs, and a strap extending across the concavity of the comb, having its opposite ends passed through openings in the comb and cover, forming the sole connection therefor, and also providing fastening means for the device.

4. A tail-protector, comprising a comb, a cover spaced therefrom, a back yieldingly supported upon the cover, of larger size than the latter, and provided with spurs exteriorly of the cover, and fastening means for the device.

In testimony that I claim the foregoing as my own I have hereto affixed my signature in the presence of two witnesses.

HARVEY H. JONES.

Witnesses:
JOHN A. PACKER,
L. G. TURNER.